United States Patent Office 3,274,300
Patented Sept. 20, 1966

3,274,300
PREPARATION OF O,O-DIALKYL PHOSPHORODITHIOATES
John R. Van Wazer, La Due, and Kurt Moedritzer, Webster Groves, Mo., assignors to Monsanto Company, a corporation of Delaware
No Drawing. Filed Dec. 30, 1963, Ser. No. 334,610
5 Claims. (Cl. 260—981)

The present application is a continuation in part of copending application, Serial No. 225,393 filed September 21, 1962, now abandoned.

The present invention relates to the preparation of O,O-dialkyl phosphorodithioates. It is an object of the invention to provide a method which gives higher yields of O,O-dialkyl phosphorodithioates than have been possible by previously known methods.

The O,O-dialkyl phosphorodithioates are valuable compounds of commerce which are employed for various purposes such as in the preparation of biological toxicants. However, the conventional methods available for the preparation of such compounds do not give particularly good yields and also result in large quantities of by-products for which there are no markets.

O,O-dialkyl phosphorodithioates have generally been prepared from phosphorous pentasulfide, $P_2S_5$ with alcohols such as ethanol giving O,O-diethyl phosphorodithioate; while n-butanol gives O,O-dibutyl phosphorodithioates. When this reaction is carried out by the conventional procedure the yield of the desired compound such as that from butyl alcohol is approximately 62%, based on phosphorus.

However, it has now been found that superior yields are obtained in the preparation of O,O-dialkyl phosphorodithioates when the reaction is modified by having present in the reaction mixture a form of phosphorus sulfide with an excess of sulfur combined therein as a solid solution product. The sulfur may exist as various combined forms, or be present in a dissolved state in the solid; however, it has been found essential to use a sulfur to phosphorus atomic ratio of at least 2.6, preferably 2.6 to 4.0, and more preferably 2.6 to 3.0. In this way it has been found that the yield of the desired O,O-dialkyl phosphorodithioate is increased to substantially 100%. Upon completion of the reaction, the excess sulfur is readily recovered such as by filtration. Such excess sulfur may then, if desired be recycled to the process for again combining with phosphorus sulfide in the present method.

The present invention makes use of phosphorus sulfides as starting materials with the sulfur to phosphorus atomic ratio being maintained within the limits set forth above. Various forms of phosphorus sulfide compounds may be employed as starting materials together with sufficient sulfur to achieve a sulfur to phosphorus atomic ratio of at least 2.6, or preferably from 2.6 to 4.0 and more preferably from 2.6 to 3.0. For example, $P_4S_7$ may be used together with an excess of sulfur to provide an ultimate S/P ratio of 3.2 for use in the present process. In another example, phosphorus pentasulfide, $P_2S_5$ is used as the starting material with an excess of free sulfur, e.g., with a S/P ratio of 3.0 in order to provide a convenient sulfur and phosphorus source for the present reaction.

However, it has been found that the proportion of the added combined sulfur is quite critical and should be maintained within the range of a total sulfur content relative to the phosphorous within the above atomic ratios. For example, when the atomic ratio is 2.5, the product yield has been found to be only 62%, while the use of a ratio of 3.2 gives a product yield of 100% based on phosphorus reacted.

It has also been found necessary for the excess sulfur to be in solution or chemical combination with the phosphorus in the phosphorus sulfide composition. The use of mechanical mixtures of sulfur with the conventional phosphorus sulfide stoichiometric compounds such as phosphorus pentasulfide $P_2S_5$ fails to give the superior results obtained by the use of compositions in which the sulfur exists in solid solution or chemically combined form.

It has also been found that when the reaction of an alcohol with phosphorus pentasulfide employs an amorphous form of the said phosphorus pentasulfide, a surprising increase in the yield of the reaction is obtained. The amorphous form of phosphorus pentasulfide is readily obtained by quenching this material from the molten state to the solid condition instead of being slowly cooled, since slow cooling results in a crystalline material. The criterion for the amorphous condition is that X-ray examination does not show the presence of the crystalline state.

The alcohols contemplated for use in the present invention are generally the primary, secondary and tertiary alcohols having from 1 to 20 carbon atoms, for example, ethanol, propanol, isopropanol, n-butanol, isobutanol, tert-butanol, as well as the various pentanols, hexanols, heptanols, octanols, nonanols, decanols, etc., including the compounds up to and including the 20 carbon atom alcohols.

The temperatures employed in the present reaction are not a critical variable. The reaction may be carried out under atmospheric pressure as well as vacuum and pressure conditions. The reaction may be conducted solely with the phosphorus sulfide described above, and the alcohol, and may also be carried out in the presence of diluents and solvents such as excess alcohol, hydrocarbons, such as decane and benzene, halocarbons such as carbon tetrachloride chloroform, etc.

The following examples illustrate certain specific embodiments of the present invention.

*Example 1*

A series of phosphorus sulfide solid solutions with varying proportions of excess sulfur are prepared by combining recrystallized $P_4S_3$ with chemically pure precipitated sulfur so as to have the following S/P atomic ratios: 2.50, 3.00, 3.50. The respective mixtures are individually sealed, under a nitrogen atmosphere in 7 mm./O.D. silica tubes 30 cm. long. The tubes are then held in a furnace at 350° C. until a clear melt ensues. Quenching is achieved by dropping the entire tube with its contents into a well-stirred bath of finely crushed ice and water.

The various phosphorus sulfide solid solutions with excess sulfur are then employed in a mixture with the alcohol, specifically n-butanol. Portions of n-butanol are used as the reaction liquid in a round bottom flask into which an amount of phosphorus sulfide with sulfur is added, corresponding to one gram atom of phosphorus per liter of alcohol. This mixture is heated to a temperature of about 115° C. for a period of about 1 hour with moderate stirring. During the course of the reaction, dry nitrogen is passed into the reaction vessel to sweep out the evolved hydrogen sulfide which is absorbed in a sodium acetate buffered solution of zinc chloride.

In order to determine the evolved hydrogen sulfide, iodine is added to the resulting zinc sulfide in the zinc chloride solution, the titration being carried out with thiosulfate.

The products obtained in the above reaction are identified by nuclear magnetic resonance. The yields corresponding to the three sulfur-phosphorus atomic ratios are as follows:

| S/P ratio: | Yield of phosphorodithioate based on P, percent |
|---|---|
| 2.5 | 93 |
| 3.0 | 100 |
| 3.5 | 100 |

In all of the present experiments the phosphorodithioate is recovered from the reaction mixture by removing excess sulfur as an insoluble material by filtration, leaving the desired product in solution in the excess alcohol or other reaction medium.

*Example 2*

In order to prepare O,O-diethyl phosphorodithioate, the method of Example 1 is carried out using a phosphorus sulfide with a S/P ratio of about 2.8, derived from $P_4S_{10}$, with excess sulfur in solid solution. The phosphorus sulfide is substantially, as in Example 1 in the amorphous state (no crystallinity detectable) because of quenching of the solution of $P_4S_{10}$ and sulfur. The phosphorus sulfide is heated with ethyl alcohol as the alkyl component at refluxing conditions. The yield is substantially quantitative.

*Example 3*

In order to prepare the O,O-didodecyl phosphorodithioate, the method of Example 1 is carried out using a S/P atomic ratio of about 2.6 for the phosphorus sulfide, derived from $P_4S_7$ combined with an excess of sulfur. Benzene is used as the reaction medium. Dodecyl alcohol is added in stoichiometric proportions as the alkyl component. The ultimate product, O,O-didodecyl phosphorodithioate is separated from the excess sulfur by filtration after which the benzene is removed by distillation to leave the O,O-didodecyl phosphorodithioate in substantially quantitative yield as the product.

*Example 4*

In order to show the necessity for solution of the sulfur in the phosphorus sulfide, an experiment is performed using a mechanical mixture of 2.5 grams sulfur with 8.7 grams $P_2S_5$. To this mixture is added 76.7 grams of n-butanol, after which the mixture is heated to refluxing (about 114° C.) for 1 hour, at which time all of the sulfur and $P_2S_5$ are dissolved in the clear reaction mixture.

The product, O,O-dibutyl phosphorodithioate is identified by phosphorus nuclear magnetic resonance using the chemical shift at −87 p.p.m. It is found that free sulfur in excess of the stoichiometric proportion is precipitated as a yellow powder when the reaction mixture is cooled. The yield of the O,O-dibutyl phosphorodithioate, however is only about 60%, in contrast to the substantially quantitative yields obtained when conducting the same reaction with a mixed crystal combination of sulfur with $P_2S_5$.

What is claimed is:

1. Process for the preparation of O,O-dialkyl phosphorodithioates which comprises mixing and contacting phosphorus sulfide as a solid solution with an excess of sulfur such that the total sulfur/phosphorus atomic ratio is from 2.6 to 4.0 with an alcohol having from 1 to 20 carbon atoms at a temperature which is substantially that of the boiling point of the said alcohol, the proportion of the said alcohol being in approximately stoichiometric relationship to the phosphorus present.

2. Process for the preparation of O,O-dialkyl phosphorodithioates in which the alkyl substituents are primary which comprises mixing and contacting phosphorus sulfide as a solid solution with an excess of sulfur such that the total sulfur/phosphorus atomic ratio is from 2.6 to 3.0 with an alcohol having from 1 to 20 carbon atoms at a temperature which is susbtantially that of the boiling point of the said alcohol, the proportion of the said alcohol being in approximately stoichiometric relationship to the phosphorus present.

3. Process for the preparation of O,O-diethyl phosphorodithioates which comprises mixing and contacting phosphorus sulfide as a solid solution with an excess of sulfur such that the total sulfur/phosphorus atomic ratio is at least 2.6 with ethanol at a temperature which is substantially that of the boiling point of the said ethanol, the proportion of the said ethanol being in approximately stoichiometric relationship to the phosphorus present.

4. Process for the preparation of O,O-dibutyl phosphorodithioates which comprises mixing and contacting a phosphorus sulfide as a solid solution with an excess of sulfur such that the total sulfur/phosphorus atomic ratio is at least 2.6 with butanol at a temperature which is substantially that of the boiling point of the said butanol, the proportion of the said butanol being in approximately stoichiometric relationsihp to the phosphorus present.

5. Process for the preparation of O,O-didodecyl phosphorodithioates which comprises mixing and contacting phosphorus sulfide as a solid solution, characterized by excess of sulfur such that the total sulfur/phosphorus atomic ratio is at least 2.6 with dodecanol at a temperature which is substantially that of the boiling point of the said dodecanol, the proportion of the said dodecanol being in approximately stoichiometric relationship to the phosphorus present.

No references cited.

CHARLES B. PARKER, *Primary Examiner.*

RICHARD L. RAYMOND, *Assistant Examiner.*